(12) United States Patent
Nardone

(10) Patent No.: US 6,557,873 B2
(45) Date of Patent: May 6, 2003

(54) REPLACEMENT FRONT WHEEL ASSEMBLY FOR A ROLLER BOARD

(75) Inventor: Moamar Nardone, München (DE)

(73) Assignee: Euro-G.E.M. GmbH, Munich (DE)

( * ) Notice: Subject to any disclaimer, the term of this patent is extended or adjusted under 35 U.S.C. 154(b) by 57 days.

(21) Appl. No.: 09/748,966

(22) Filed: Dec. 27, 2000

(65) Prior Publication Data

US 2002/0063405 A1 May 30, 2002

(30) Foreign Application Priority Data

Nov. 24, 2000 (DE) .......................... 100 58 466

(51) Int. Cl.⁷ ................................. B62K 9/00
(52) U.S. Cl. .......................... 280/87.042; 280/124.113; 280/269
(58) Field of Search .................. 280/87.01, 87.021, 280/87.041, 87.042, 124.111, 124.113, 93.502, 93.509, 93.51, 267, 269

(56) References Cited

U.S. PATENT DOCUMENTS

| | | | | |
|---|---|---|---|---|
| 3,746,118 A | * | 7/1973 | Altorfer | 280/87.041 |
| 3,958,814 A | * | 5/1976 | Smith | 280/269 |
| 4,775,162 A | * | 10/1988 | Chao | 280/87.041 |
| 4,799,701 A | * | 1/1989 | Lindau et al. | 280/87.041 |
| 6,217,058 B1 | * | 4/2001 | Wang et al. | 280/87.041 |
| 6,279,930 B1 | * | 8/2001 | Chang et al. | 280/87.042 |
| 6,299,186 B1 | * | 10/2001 | Kao et al. | 280/87.041 |

FOREIGN PATENT DOCUMENTS

DE WO 00/03773 1/2000

* cited by examiner

*Primary Examiner*—Avraham Lerner
(74) *Attorney, Agent, or Firm*—Todd E. Garabedian; Wiggin & Dana LLP

(57) ABSTRACT

A replacement front wheel assembly (2) for a rollerboard having a footboard (48) provided in the rear end portion thereof with at least one wheel and in the front end portion thereof with a steering head bearing (4) for connection of a front wheel assembly (2) and a steering rod (54) connected to the front wheel assembly (2), characterized in that the front wheel assembly (2) comprises a connecting member (6) for connection to the steering head bearing (4) as well as two front wheels (8; 10) that are each offset towards a respective side of the longitudinal axis of the roller board.

19 Claims, 4 Drawing Sheets

REPLACEMENT FRONT WHEEL ASSEMBLY FOR A ROLLER BOARD

FIELD OF THE INVENTION

The invention relates to a replacement front wheel assembly for a roller board having a footboard provided at the rear end portion thereof with at least one wheel and at the front end portion thereof with a steering head bearing means for connection of a front wheel assembly and a steering rod connected to the front wheel assembly.

BACKGROUND OF THE INVENTION

Roller boards most recently have become trendy sports equipment. They were introduced into the market in large numbers in a large variety of different kinds. There are basically different types of roller boards, including boards with one front wheel and boards with two front wheels. Roller boards having one front wheel are considerably less expensive to manufacture and thus correspondingly less expensive as regards the sales price thereof. Thus, they have stood up well in the market, and a very large portion of the roller boards sold so far can be reckoned among these "single-track roller boards". In the overall construction thereof, these single-track roller boards are very similar to the long known children's scooters. They are basically just of smaller built than the latter and in most cases provide the possibility of being brought into a handy shape for transport, by folding up components, sliding them together, etc.

Differing from these single-track roller boards are roller boards with two front wheels. These front wheels are individually joined to the footboard of the roller board by means of a steering mechanism and, by laterally pivoting the steering rod of the roller board, can be steered into a corner in synchronism, but each wheel being pivoted around its own pivot axis. During such pivoting of the steering or control rod for turning or cornering of the front wheels, there is typically caused tilting of the footboard at the same time, which automatically provides for the user to assume an inclined position as well. The advantage of such roller boards with two front wheels on the one hand resides in more stable handling ability and in particular also in more stable cornering ability. An additional advantage consists in that such roller boards can stand on their own, which of course is not possible with single-track roller boards. A significant disadvantage of such roller boards consists in that they are relatively complex in manufacture. Another handicap of such roller boards, that is due to the relative complex construction thereof as well, is that it has not been possible to produce a sufficient number of roller boards with two front wheels in the most recent boom period in which the demand for roller boards all over the world could not be fulfilled. This had the effect that they lost more and more market shares to single-track roller boards. The inventor of the present invention thus assumes that a retrofitting set allowing single-track roller boards to be relatively easily and inexpensively converted into such roller boards with two front wheels, could be very successful in the market.

SUMMARY OF THE INVENTION

It is thus the object of the present invention to make available a replacement front wheel assembly of the type indicated, by means of which single-track roller boards can be retrofitted relatively easily and inexpensively to such roller boards with two front wheels.

According to the invention, this object is met by a replacement front wheel assembly which is characterized in that the front wheel assembly comprises a connecting member for connection to the steering head bearing means as well as two front wheels that are each offset towards a respective side of the longitudinal axis of the roller board.

The steering head bearing means of a roller board typically has a construction similar to the steering head bearing of a bicycle, with two ball bearings, which are disposed at the upper and lower ends, respectively, of the tubular steering head, supporting a tubular connecting member on which corresponding bearing shells for the ball bearings are provided. The relative position of the bearing shells on the connecting member relative to each other may be changed, for example, via a screw thread. In this manner, the bearing clearance can easily be adjusted. In case of the single-track roller boards usual in the trade, the one front wheel is adapted to be rotated together with a corresponding connecting member in the steering head bearing means. The connecting member, at the top end thereof, has a steering rod or handlebar connected thereto, i.e. the latter is typically clamped thereto by means of a threaded connection. The steering motions of the steering rod are transferred to the front wheel directly, so that turning of the steering rod into the desired cornering direction has the effect that the front wheel is turned into this cornering direction as well. According to the present invention, the connecting member, instead of one single front wheel, is provided with two front wheels that are each arranged offset to a respective side of the longitudinal axis of the roller board. By relatively simple replacement of the "single-track front wheel assembly" with the "replacement front wheel assembly" according to the invention, it is thus possible to convert a single-track roller board into a roller board with two front wheels. Preferably, the two front wheels are mounted on the front wheel assembly such that pivoting of the steering rod to one side of the longitudinal axis of the roller board effects cornering or turning of each individual wheel into this direction. It is particularly preferred if both wheels, though being turned individually about different steering axes, are turned in synchronism with each other so that both front wheels follow the proper curved path each.

Preferably, the two front wheels, alternatively or in addition, are mounted on the front wheel assembly such that, upon mounting of the replacement front wheel assembly on the roller board, turning of the steering rod effects turning of the two front wheels into the same direction to which the steering rod has been turned. A simple embodiment, in which turning of both wheels can be realized by turning of the steering rod only (whereas no turning of the wheels by tilting of the steering rod can be realized), comprises a transverse bar which is secured to the lower end of the connecting member and which has one front wheel each connected to the respective outer ends thereof. When the steering rod is turned, the transverse rod together with the two front wheels attached thereto is turned as well. By slight inclination of the axis of the steering rod, i.e. of the steering head bearing, it can be ensured that the roller board, despite this simple construction, upon cornering takes the required inclined position. However, particularly advantageous is the combination of the two steering mechanisms with each other, i.e. turning of each individual front wheel upon lateral pivoting of the steering rod and common rotation of the two wheels jointly about the steering axis. With this combination, extremely maneuverable roller boards can be produced. On the other hand, it is also possible to produce roller boards with very high track stability, for example, roller boards for high speeds with good straight-running properties which nevertheless have good steering properties.

Preferably, the front wheels are connected to the outer ends of a transverse bar, and it is particularly preferred to connect the transverse bar to the connecting member such that, upon mounting of the replacement front wheel assembly on the roller board, it is pivotable about the longitudinal axis of the roller board, but fixed about the vertical axis. This type of mounting can be carried out preferably by means of a U-shaped holding means on the connecting member, with the two legs of the "U"-shape being directed downwardly. It is thus possible to provide a pin in the longitudinal direction of the roller board between the two legs of the "U"-shape. The transverse bar may be pivotally supported on this pin. By means of this type of mounting, it is ensured at the same time that the transverse bar is connected to the connecting member in fixed manner about the vertical axis.

The transverse bar and the connecting member as well as all components of the replacement front wheel assembly in general are arranged relative to the roller board so as to be rotatable in the steering head bearing means. It is thus pointed out that, in the present application, all statements, for example, with respect to the direction or arrangement of individual components of the front wheel assembly or of the entire replacement front wheel assembly, made with reference e.g. to the longitudinal direction of the roller board, are to be understood as relating to the "neutral setting" of the roller board. This neutral setting of the roller board is understood to be the position of the roller board in which the same runs straight ahead.

Preferably, each of the front wheels is connected by means of an axle support to the transverse bar so as to be pivotable about the vertical axis and the front wheels are connected to each other so as to be pivotable in synchronism with each other only.

At least one of the two axle supports preferably is connected to the connecting member such that, when the replacement front wheel assembly is mounted to the roller board, pivoting of the steering rod around the longitudinal axis of the roller board effects turning of each individual one of the two front wheels. The connection of the at least one axle support on the connecting member is carried out, for example, by means of a connecting rod. The connecting rod may be connected at one end thereof to the axle support at a location that is offset from the vertical turning axis of the axle support a certain distance forwardly in running direction, and at the other end thereof may be connected to the connecting member at a location that is offset from the longitudinal turning axis of the transverse bar a certain distance upwardly towards the steering head bearing means. With this arrangement of the connecting rod, tilting of the steering rod about the longitudinal turning axis of the transverse bar results in shifting of the connecting rod and, accordingly, in turning of the axle support about the vertical turning axis of the axle support. Due to the synchronous connection of the two axle supports to each other, synchronous turning of both wheels in common manner upon pivoting of the steering rod is ensured. If the steering rod is rotated about its turning axis as well, turning of the wheels is effected in addition to the steering motion of the wheels by pivoting of the steering rod, so that an extremely narrow cornering radius is possible upon pivoting and turning the steering rod in the same direction.

As an alternative, the axle supports and preferably also the transverse bar are tilted towards the front in relation to the longitudinal axis of the roller board in such a manner that the vertical turning axis of the axle supports is also tilted towards the front in relation to the longitudinal axis of the roller board. If with this forwardly tilted vertical turning axis of the axle supports, the axles proper of the wheels are offset towards the rear with respect to the vertical turning axis, pivoting or tilting of the control rod towards the side effects turning of each one of the two front wheels. The connecting rod described in the preceding paragraph is not necessary with this construction. The synchronous connection of the two wheels to each other ensures synchronous pivoting of the two wheels.

Preferably, the replacement front wheel assembly is provided with a resetting means or mechanism tending to keep the front wheels in the neutral position. This resetting means provides for particularly stable straight-running properties, which is very desirable for reasons of driving safety. The stronger the resetting means, the more stable the straight-running properties and the less rapid the response of the steering system of the roller board to desired changes in direction. It is possible to provide two separate resetting means, on the one hand for resetting the rotation of the steering rod and on the other hand for resetting the pivoting of the steering rod. In particular in pivoting the steering rod, the resetting means can be constituted in that e.g. the vertical axis about which the axle support is pivotally supported on the transverse member, is slightly pivoted to the front or to the rear in running direction, so that the weight of the user of the roller board has the tendency of resetting the wheels to the neutral position during the ride. In addition to gravity, for example springs or other elastic members may be provided for the resetting means. For example, it is possible to provide two springs between the upper connecting web of the U-shaped holding means and the transverse bar such that one of the springs effects resetting upon pivoting of the control rod to the left and the other one of the springs effects resetting upon pivoting of the control rod to the right. Springs of flat resilient material or wound springs of spring wire may be provided for this purpose.

The latter may be supported e.g. on a bolt arranged above the transverse bar so as to extend through the two legs of the U-shaped holding means.

Preferably, there is provided a limiting means or mechanism for limiting the steering rotation of the control rod and the front wheels, respectively. This may be a fixed limiting means in the form of a stop. The U-shaped holding means may be designed such that, upon turning of the control rod, it abuts on the steering head bearing means or the footboard or any connecting member interposed there between, before one of the front wheels establishes contact with the footboard, for example. As an alternative, a kind of splashboard or covering may be provided for the wheels, which effectively prevents contacting between the front wheels and the footboard for example. It is also preferred to provide an adjustable limiting means that can be adjusted for front wheels of different sizes. It is thus possible to provide different limiting members for specific wheel sizes, which may be attached e.g. to the U-shaped holding means. In addition thereto, it is also possible to provide an adjustable limiting means which, for example, is provided with a graduation for indicating for each wheel size the proper position of the limiting means.

Preferably, there is provided a covering at least for the replacement front wheel assembly. It is particularly preferred to provide the transverse bar, the connecting member, the connecting rods and the axle supports with a covering completely or in part. The wheels also may be accommodated in part in the covering or may have a separate covering. The covering on the one hand has the advantage of reducing soiling of the components, in particular of the moving components. In addition thereto, the covering may also have a molding effect on the optical appearance of the replacement front wheel assembly and the roller board in its entirety, respectively. By way of different coverings, it is possible for example to give different designs to the replacement front wheel assemblies offered via different distribution channels. In addition thereto, the covering may be used as advertising carrier. For example, the coverings may be provided so as to be replaceable and may be mountable to the replacement front wheel assembly proper by means of simple pluggable and/or latchable connections.

In addition thereto, the invention relates to a roller board comprising a front wheel assembly according to the invention.

The invention moreover relates to a method of retrofitting a single-track roller board comprising a footboard which in the rear end portion thereof is provided with at least one wheel and in the front end portion of which there is mounted a front wheel in a steering head bearing means by means of a connecting member, so as to be rotatable by a steering rod, to a roller board comprising at least two steerable front wheels, said method comprising the steps of:

(a) demounting the steering rod from the connecting member;

(b) demounting the connecting member and one front wheel from the steering head bearing means;

(c) attaching a replacement front wheel assembly on the steering head bearing means; and (d) mounting the steering rod on the connecting member of the replacement front wheel assembly.

It may be expedient to replace the bearings of the steering head bearing means during retrofitting of the roller board. As an alternative it is also possible, for example by omission of the bearings of the steering head bearing means and by simple threaded attachment of the connecting member to the steering head bearing means, to fixedly attach the connecting member to the remainder of the roller board. The steering head bearing thus is rendered inoperative and the replacement front wheel assembly is fixedly connected to the footboard. Steering of the roller board then is possible only by laterally pivoting of the steering rod. Retrofitting thus is rendered considerably less expensive on the one hand. On the other hand, it may also be expedient for other reasons if only one of the two steering mechanisms, namely the one operated by lateral pivoting of the steering rod, is available for steering the roller board.

BRIEF DESCRIPTION OF THE DRAWINGS

The invention and further developments of the invention will be elucidated in more detail hereinafter by way of an embodiment shown in the drawings wherein.

DETAILED DESCRIPTION

Figure 1:
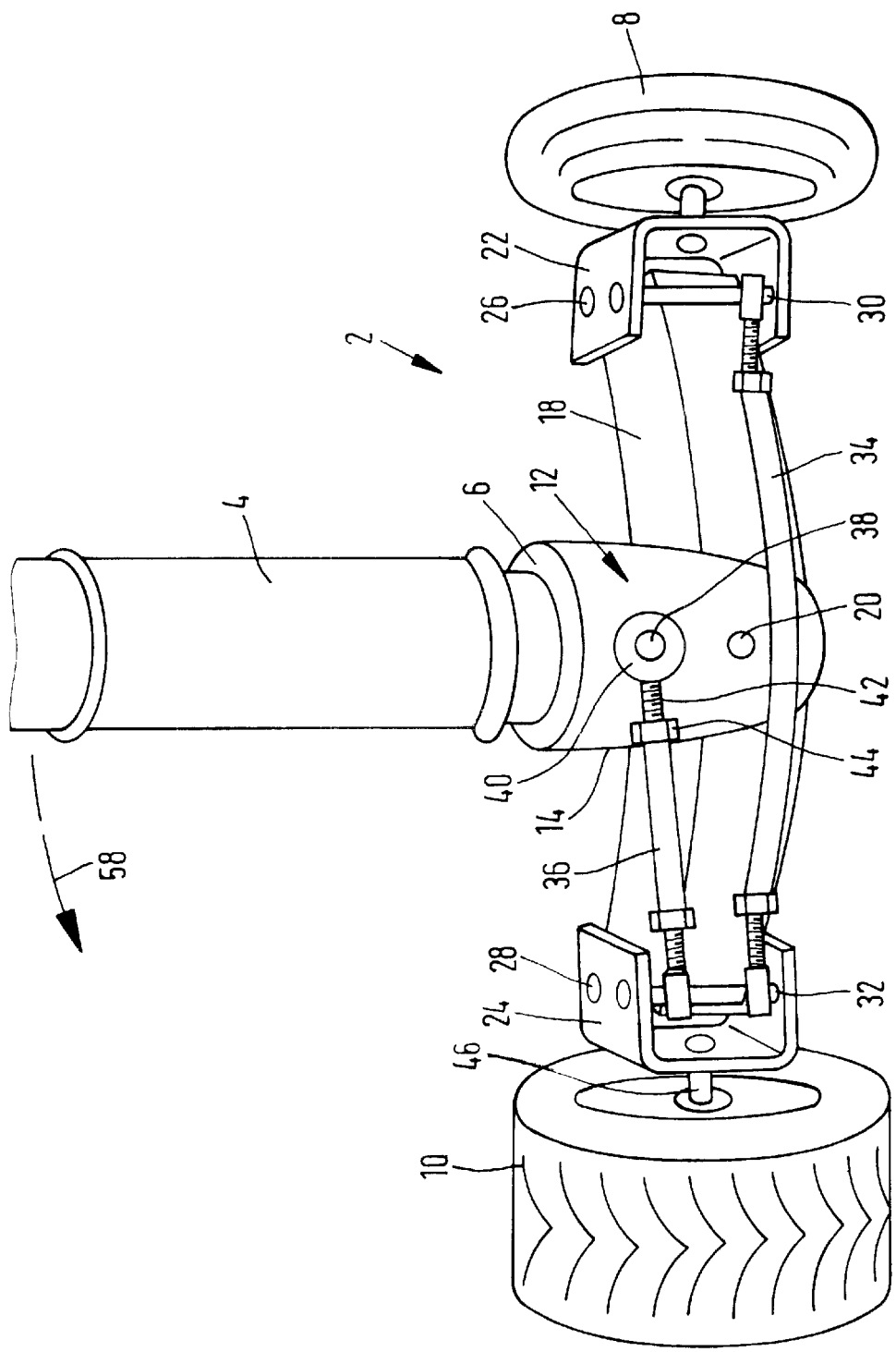
FIG. 1 shows a front view of a replacement front wheel assembly.

FIG. 1 illustrates the replacement front wheel assembly 2 according to the invention as well as parts of the roller board. In particular, one can see the steering head bearing means 4 through which the replacement front wheel assembly 2 is mounted to the footboard of the roller board. The replacement front wheel assembly 2 reveals in particular the connecting member 6 for connection to the steering head bearing means 4. Furthermore, it is possible to see two front wheels 8, 10, with the embodiment shown in the drawing illustrating two different wheels. Front wheel 8 serves for use on hard ground, for example on tar ground. Front wheel 10 has a considerably wider bearing area and is suitable for use on softer ground. The wheels typically are provided with ball bearings for improved running properties. The region of the running treads of the wheels is made of a plastics material. Depending on the intended use, this may be a relatively hard plastics material or a relatively soft plastics material, with the softer plastics material being particularly preferred for use on softer grounds. Harder plastics material, in particular on hard ground, permits clearly lower rolling resistances and therefore is generally preferred.

Connecting member 6 is of tubular design in its upper portion for connection to the steering head bearing means 4. It is rotatably mounted in the steering head bearing means 4 by means of bearings (not shown), for example ball bearings. The entire attachment of connecting member 6 in steering head bearing means 4 basically corresponds to the attachment of a bicycle fork in the steering head of a bicycle. In case of the replacement front wheel assembly 2 according to the invention, too, the adjustment of the bearing clearance expediently takes place via a threaded connection.

The connecting member 6 in downward direction is continued by a U-shaped holding means or bracket 12, with the two legs 14, 16 of the "U"-shaping being directed downwardly. Between the legs 14, 16, a transverse bar 18 is supported around a pin 20 arranged substantially in the longitudinal direction of the roller board. The outer ends of transverse bar 18 each have an axle support 22, 24 supported thereon so as to be rotatable about a vertically arranged pin 26, 28. In each one of the two axle supports 22, 24, there is provided an additional pin 30, 32 having a synchronizing rod 34 and a connecting rod 36, respectively, connected thereto. While synchronizing rod 34 interconnects the two pins 30 and 32, connecting rod 36 connects one of the two pins 30, 32 to a mounting trunnion 38 provided on connecting member 6.

It can be seen that synchronizing rod 34 and connecting rod 36 each have connecting heads 40 at their ends, which may be provided in the form of spherical heads. It is especially advantageous to provide the connecting rods 34 and 36 in length-adjustable manner, as shown in the present embodiment by way of screw-type threads 42 and locknuts 44.

Instead of synchronizing rod 34, there may also be provided, for example, an additional connecting rod between connecting trunnion 38 and pin 30 on axle support 22. Each individual one of the connecting rods 34, 36 then effects corresponding shifting of the axle support 22 and 24, respectively, with the shifting of both axle supports 22 and 24, respectively, taking place substantially in synchronous manner.

It is possible to provide the transverse bar 18 in relatively stiff manner. However, it may be preferred to form transverse bar 18 of an elastically resilient material so as to provide a certain resilience for the two front wheels. This kind of resilience, in comparison with the provision of a soft plastics material on the running tread of the wheels 8, 10, has the great advantage that it does not negatively affect the good rolling properties of the running treads of hard plastics material. The transverse bar 18 in principle can be formed from a large variety of materials. It is conceivable, for example, to make the same from metal or plastics material. However, it is also possible to use a suitable wood material, for example multilayer, laminated wood material.

It can be seen that the wheels 8, 10 are mounted on axles 46 that are attached in axle supports 22, 24. It is particularly expedient if the axles 46 are replaceable. This permits the provision of wheels of different widths, i.e. axles of different lengths, on the axle supports. It is thus rendered possible in particularly simple manner to attach different front wheels on the roller board.

Figure 2:
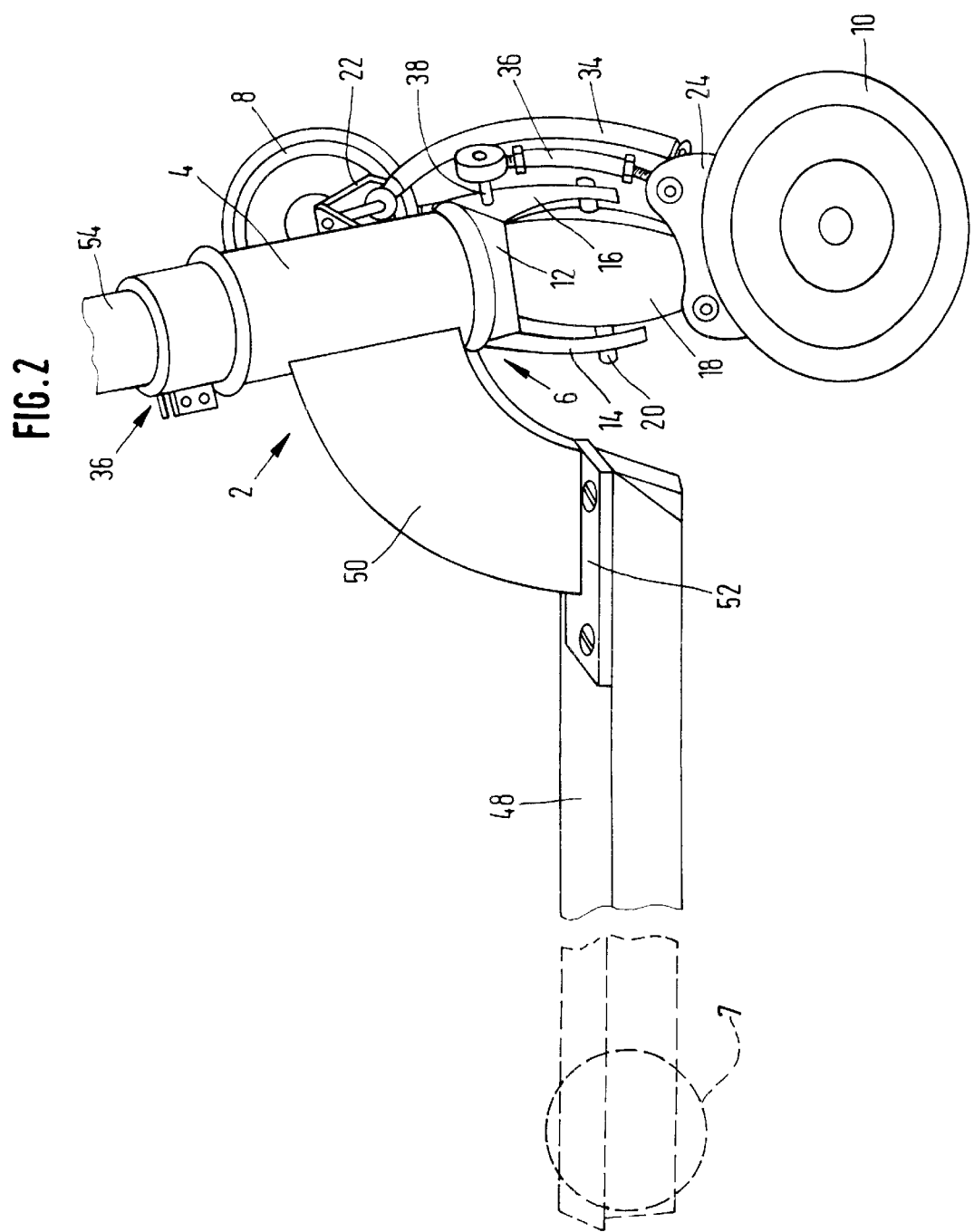
FIG. 2 shows a side view of the replacement front wheel assembly according to the invention as shown in FIG. 1.

FIG. 2 illustrates the replacement front wheel assembly 2 in a side view. Corresponding components and elements are designated with the same reference numerals in FIGS. 1 and 2. FIG. 2 particularly clearly shows the U-shaped holding means 12 between the legs 14, 16 of which the transverse bar 18 is pivotally mounted on pin 20. The illustration of FIG. 2 furthermore reveals the footboard 48 of the roller board as well as a strut 50 which, via a corresponding connecting flange 52, is releasably attached at its bottom end to footboard 48 by means of screws. Strut 50, at the upper end thereof, is welded to the steering head and, at the lower end thereof, is welded to flange 52. Strut 50, flange 52 and steering head together constitute the steering head bearing means 4. Strut 50 may be of foldable design, so that steering rod or handlebar 54 can be folded to an inoperative position substantially parallel to the footboard. At the rear end portion of footboard 48, as seen in running direction, there is mounted a substantially central rear wheel 7. Above steering head bearing means 4, the lower end of steering rod 54 is visible in the form of a tube. Steering rod 54 is secured to connecting member 6 by means of a clamping collar 56 in such a manner that rotation of the steering rod 54 about the longitudinal axis of the tube effects rotation of connecting member 6, transverse bar 18 as well as of wheels 8 and 10.

Thus, there are formed two basically different steering mechanisms for the replacement front wheel assembly 2. On the one hand, rotation of the steering rod about the longitudinal axis of tube 54 causes rotation of the transverse bar 18 and thus rotation of wheels 8 and 10 about a common fulcrum that is located on the longitudinal axis of tube 54.

The second steering mechanism is triggered by tilting the steering rod in lateral direction and results from the mechanics of the replacement front wheel assembly 2. It can be seen from FIG. 1 that lateral tilting of the steering rod about the fulcrum of pin 20 in the direction of arrow 58 effects displacement of the connecting rod 36 in substantially the same direction as at 58. By this displacement of connecting rod 36, the pin 32 mounted on axle support 24 is displaced towards the left. This causes rotation of axle support 24 about pin 28. Due to the fact that the two axle supports 22 and 24 are connected to synchronizing rod 34, this effects synchronous movement of the second axle support 22 and accordingly synchronous movement of wheels 8 and 10.

Accordingly, a roller board equipped with the replacement front wheel assembly according to the invention can be steered by means of two different steering mechanisms. With the combination of both steering mechanisms, it is possible to steer the roller board through particularly narrow radii.

A covering (not shown) may be used to cover essential parts of the replacement front wheel assembly, it is particularly expedient to substantially cover the transverse bar 18, the U-shaped holding means 12, the rods 36 and 34 as well as the axle supports 22 and 24. The covering expediently is applied from the front over the replacement front wheel assembly 2. It may be formed of a resiliently elastic plastics material which, for application, is slightly bent open and after application thereof tends to resume its original position. It is possible, for example, to fix the covering on the replacement front wheel assembly 2 merely by the bias of the covering. As an alternative or in addition thereto, there may be provided corresponding latch-type or plug-type connections for attachment of the covering.

Figure 3:
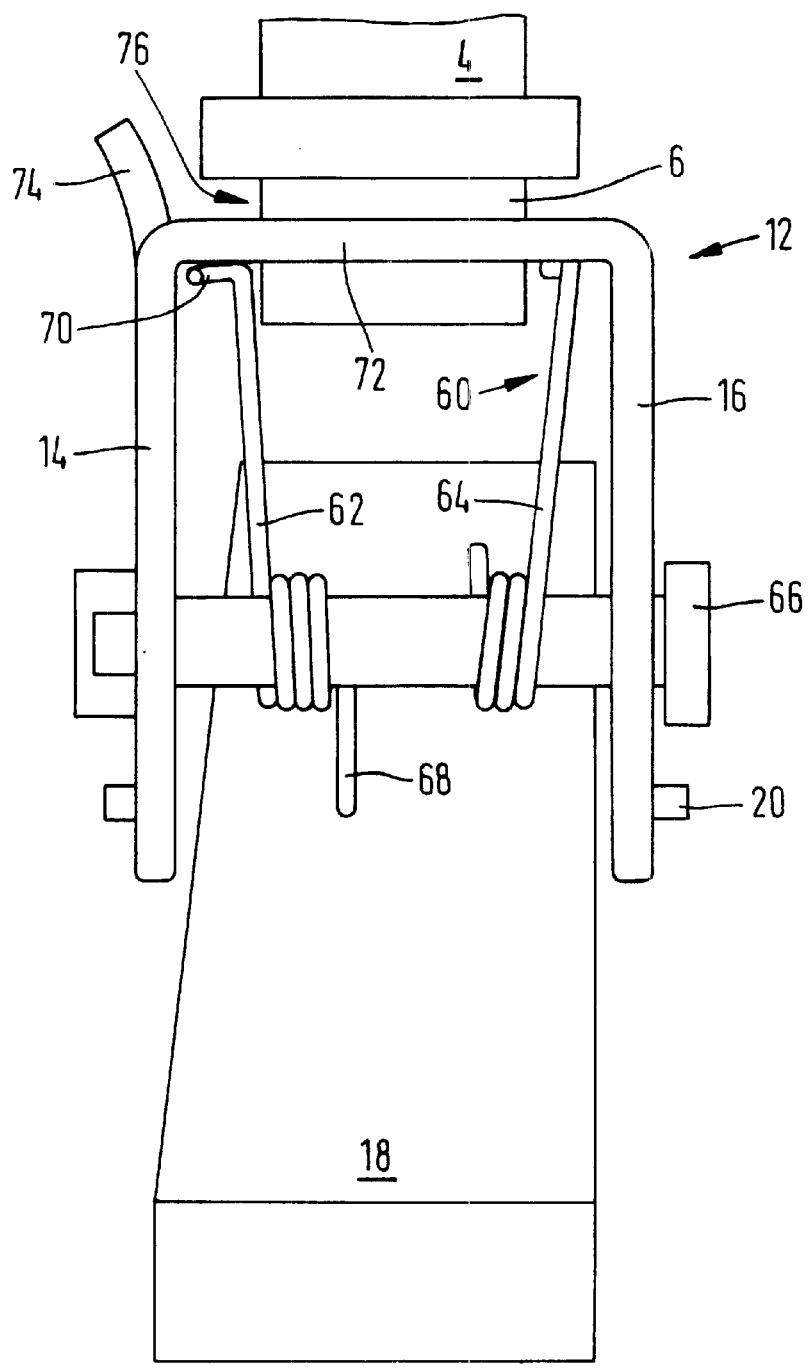
FIG. 3 shows a side view similar to FIG. 2 of a replacement front wheel assembly according to the invention, comprising a resetting means.

FIG. 3 shows a replacement front wheel assembly comprising a resetting means or mechanism 60 in the form of two springs 62, 64. Springs 62, 64 are wound from spring wire and are supported on a bolt 66 between the two legs 14, 16 of U-shaped holding means or bracket 12. Springs 62, 64 each have two abutment extensions 68, 70 by means of which they abut on the transverse bar 18 and the upper connecting web 72 of holding means 12, respectively. The two springs 62, 64 are arranged in laterally reversed manner so that one of the springs 62, upon pivoting of the front end of the transverse bar 18 (as seen in the perspective view of FIG. 3) in upward direction, has the tendency of resetting the transverse bar to its original position. The other spring 64 in corresponding manner has the tendency of resetting the same end upon pivoting the same in downward direction. Both springs 62, 64 should have substantially the same spring force. In the ideal case, both springs are slightly biased in the neutral position so that no undesirable chattering noise is caused during use of the roller board. The resetting mechanism 60 described in conjunction with FIG. 3 effects resetting of the steering mechanism during steering operations by lateral tilting of steering rod 54. A resetting mechanism tending to reset steering rod 54 to the neutral position in case of rotation thereof may be designed in very similar manner, for example using two wound springs that are arranged around connecting member 6 and are supported on one side against the holding means 12 and at the other end thereof against strut 50.

FIG. 3 furthermore shows a limiting member for the steering movement in the form of a stop member 74. Stop member 74 is attached to holding means 12 and projects in rearward and upward direction. If the steering rotation exceeds a specific maximum value, which results from the size of the front wheels, the stop member 74 illustrated abuts strut 50 and prevents further turning of steering rod 54 in this direction. Abutting of a front wheel 8, 10 against the footboard is thus effectively prevented. There may also be provided abutment members that are adjustable and may be set in accordance with the wheel size. For example, one could use stop members attached to discs which are supported on connecting member 6 e.g. in groove 76 and which can be clamped there in a specific position by means of a threaded connection.

Figure 4:
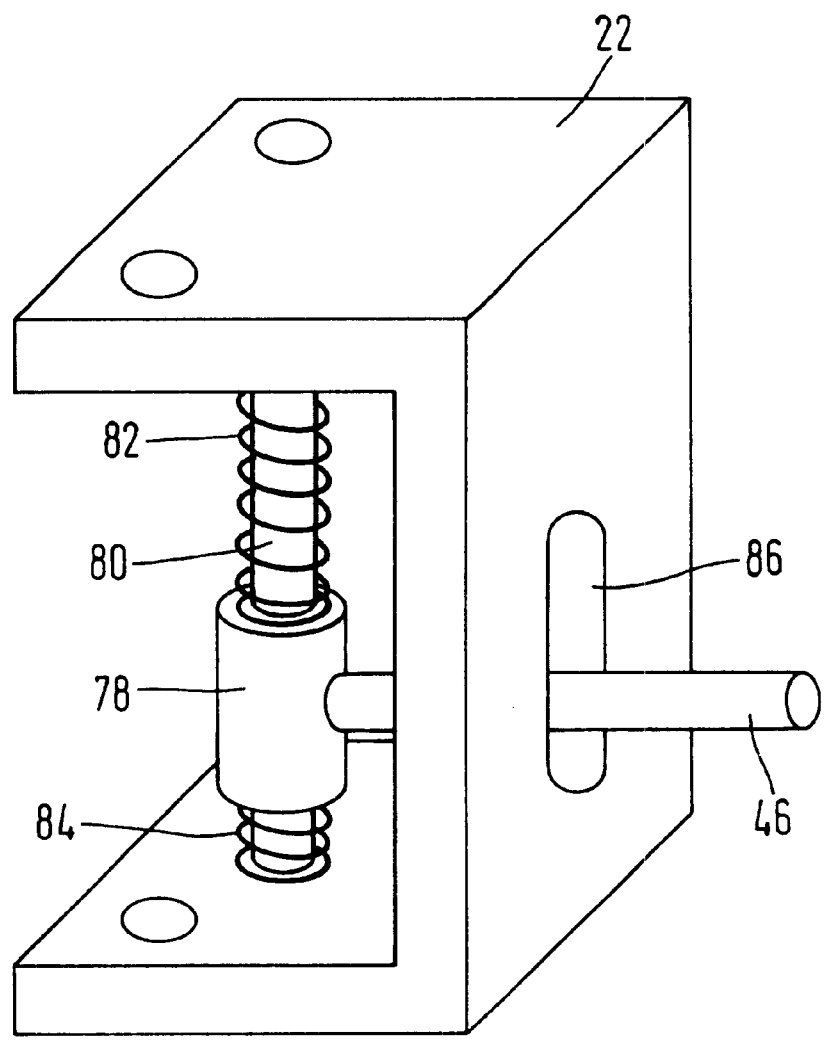
FIG. 4 shows a schematic view of an axle support with spring-supported axle.

FIG. 4 shows quite schematically an axle support 22 with a spring-supported axle 46. In particular, axle 46 is attached to a sliding tube 78. Sliding tube 78 is slidably supported on an upright tube 80. Sliding tube 78 is supported in upward direction by a spring 82. An additional, possibly weaker spring 84 may support sliding tube 78 in downward direction. Axle 46 is guided in axle support 22 in an elongate hole 86 and thus is secured against pivoting, so that safe straight-running properties of the wheel supported on axle 46 are ensured. As an alternative or in addition thereto, the sliding tube 78 and the upright tube 80 may be of other cross-sections than round cross-section, e.g. rectangular cross-section, whereby pivoting of axle 46 can be effectively prevented as well. Axle support 22 may be provided instead of axle supports 22, 24 in FIGS. 1 to 3.

For different loads e.g. due to different weight of the users or depending on the intended use, there may be provided on the one hand springs 82 of different strengths. As an alternative or in addition thereto, matching can be effected by addition or removal of spacer discs on upright tube 80 whereby the bias of spring 82 can be increased or decreased.

The resilience of the axle can also be achieved in different manner. For example, the axle 46 of an axle support 22, 24 of FIG. 1 or 2 may have a sleeve provided thereon instead of a front wheel 8, 10, and on this sleeve there may be provided a kind of link projecting towards the front and having at its front end portion the axle proper for the front wheel. The link may be supported against the axle support e.g. by a spring. In this respect, commercially available springs/damping members may be used, such as employed e.g. in model construction.

What is claimed is:

1. A roller board comprised of a footboard having a rear end portion with at least one wheel and a front end portion thereof with a steering head bearing (4) for connection of a front wheel assembly (2) and a steering rod (54) connected to the front wheel assembly (2), wherein said front wheel assembly is comprised of a connecting member (6) for connection to the steering head bearing (4) and two front wheels (8; 10) that are each offset towards a respective side of the longitudinal axis of the roller board and wherein rotation of the steering rod pivots the two wheels together about a single steering axis and tilting of the steering rod acts to pivot each wheel around its own distinct pivot axis in synchrony.

2. The roller board of claim 1, wherein said two front wheels (8; 10) are mounted on the front wheel assembly (2) such that when the latter is attached to the roller board pivoting of the steering rod (54) to one side of the longitudinal axis of the roller board effects turning of each individual wheel (8; 10) into the direction of this side.

3. The roller board of claim 2, wherein said two front wheels (8; 10) are mounted on the front wheel assembly (2) such that when the latter is attached to the roller board turning of the steering rod (54) effects turning of the two front wheels (8; 10) in the same direction in which steering rod (54) has been rotated.

4. The roller board of claim 3, wherein said front wheels (8; 10) are connected to the outer ends of a transverse bar (18).

5. The roller board of claim 4, wherein said transverse bar (18) is connected to connecting member (6) such that when said assembly is attached to the roller board it is pivotable thereon about the longitudinal axis of the roller board, but fixed about the vertical axis.

6. The roller board of claim 5, wherein said transverse bar (18) is connected to the connecting member (6) by a U-shaped holding bracket (12, with the two legs (14; 16) of the U-shape being directed downwardly.

7. The roller board of claim 6, wherein said front wheels (8; 10) are connected to the transverse bar (18) by means of axle supports (22; 24) that are pivotable about a vertical axis and connected to each other such that they are pivotable in synchronism with each other only, and in that at least one of the two axle supports (22; 24) is connected to the connecting member (6) such that when the assembly is mounted to the roller board pivoting of the steering rod (54) about the longitudinal axis of the roller board effects turning of each one of the two front wheels (8; 10).

8. The roller board of claim 7, further comprised of a resetting means selected from the group consisting of springs and other elastic members, and tending to keep the front wheels (8; 10) in the neutral position.

9. The roller board of claim 8, further comprised of a covering for parts of the replacement front wheel assembly.

10. A front wheel assembly (2) for a roller board having a footboard (48) provided in a rear end portion thereof with at least one wheel and in a front end portion thereof with a steering head bearing (4) for connection of the front wheel assembly (2) and a steering rod (54) connected to the front wheel assembly (2), the front wheel assembly (2) comprising:

a connecting member (6) coupling to the steering rod (54) and for rotation by the steering rod about a steering axis;

a transverse member (18) pivotally coupled to the connecting member for rotation about a first axis;

first and second axle supports (22, 24) rotatably mounted to the transverse member;

first and second front wheels (8, 10) respectively mounted to the first and second axle supports (22; 24);

a synchronizing rod (34) having first and second ends respectively pivotally coupled to the first and second axle supports (22; 24) so as to act, in combination with the transverse member (18), to synchronize turning of the first and second wheels;

a connecting rod (36) having first and second ends respectively pivotally coupled to the connecting member (6) and one of the first and second axle supports (22; 24) so that a tilting of the connecting member about the first axis relative to the transverse member produces a turning of the first and second wheels to steer the roller board in a direction associated with the tilting.

11. The front wheel assembly of claim 10 wherein:

the synchronizing rod (34) first and second ends each have a ball joint;

the connecting rod (36) first and second ends each have a ball joint; and the transverse member first and second ends are rotatable about first and second pins (26; 28) on the first and second axle supports (22; 24).

12. The front wheel assembly of claim 11 wherein:

the ball joints of the synchronizing rod (34) first and second ends are coupled to third and fourth pins (30; 32) on the first and second axle supports (22; 24) respectively forward of the about first and second pins (27;28);

the connecting rod (36) second end ball joint is coupled to the fourth pin (32):, and the connecting rod (36) first end ball joint is coupled to the connecting member above the first axis.

13. A roller board having:

a footboard (48) having a front end portion;

a steering head bearing (4) at the front end portion;

a front wheel assembly (2) having first arid second wheels (8; 10); and a steering rod (54) connected to the front wheel assembly (2), the front wheel assembly (2) comprising:

a connecting member (6) coupling to the steering rod (54) and for rotation by the steering rod about a steering axis;

first and second axle supports (22, 24) to which the first and second front wheels (8, 10) are respectively mounted;

means for synchronizing turning of the first and second wheels about respective and second pivot axes; and means for producing a turning of the first and second wheels about the first and second pivot axes responsive to a tilting of the steering rod to steer the roller board in a direction associated with the tilting.

14. The roller board of claim 13 wherein the means for producing a turning comprises:

a connecting rod (36) having first and second ends respectively pivotally coupled to the connecting member (6) and one of the first and second axle supports (22; 24) so that a tilting of the connecting member about the first axis relative to the transverse member produces a turning of the first and second wheels to steer the roller board in a direction associated with the tilting.

15. A replacement front wheel assembly (2) for a roller board having a footboard (48) provided in a rear end portion thereof with at least one wheel and in the front end portion thereof with a steering head bearing (4) for connection of the front wheel assembly (2) and a steering rod (54) connected to the front wheel assembly (2), wherein:

the front wheel assembly (2) is comprised of a connecting member (6) for connection to the steering rod (54) as well as two front wheels (8; 10) that are each offset toward a respective side of the longitudinal axis of the roller board;

the front wheels (8; 10) are connected to the outer ends of a transverse bar (18) which is connected to the connecting member (6) such that, when said assembly is attached to the roller board, it is pivotable thereon about the longitudinal axis of the roller board;

the front wheels (8; 10) are connected to the transverse bar (18) by axle supports (22; 24) that are pivotable about a vertical axis and connected to each ether such that they are pivotable in synchronism with each other only; and at least one of the two axle supports (22; 24) is connected to the connecting member (6) such that, when the assembly is mounted to the roller board, pivoting of the steering rod (54) about the longitudinal axis of the roller board effects turning of each one or the two front wheels (8; 10).

16. The replacement front wheel assembly (2) of claim 15, wherein the transverse bar (18) is connected to the connecting member (6) by a U-shaped holding means (12), with the two legs (14; 16) of the U-shape being directed downwardly.

17. The replacement front wheel assembly (2) of claim 16, wherein the U-shaped holding means is a bracket.

18. The replacement front wheel assembly (2) of claim 15, further comprised of a resetting means selected from the group consisting of springs and other elastic members, and tending to keep the front wheels (8; 10) in the neutral position.

19. The replacement front wheel assembly (2) of claim 15, farther comprised of a covering for parts of the replacement front wheel assembly (2).

* * * * *

UNITED STATES PATENT AND TRADEMARK OFFICE
CERTIFICATE OF CORRECTION

PATENT NO. : 6,557,873 B2
DATED : May 6, 2003
INVENTOR(S) : Moamar Nardone

It is certified that error appears in the above-identified patent and that said Letters Patent is hereby corrected as shown below:

<u>Column 9,</u>
Line 52, "(12" should read -- (12) --;

<u>Column 10,</u>
Line 44, the word "about" should be deleted; and
Line 54, "arid" should read -- and --.

Signed and Sealed this

Thirteenth Day of January, 2004

JON W. DUDAS
*Acting Director of the United States Patent and Trademark Office*